June 8, 1965 H. C. MOON, JR 3,187,509
HYDROSTATIC TRANSMISSION
Filed Sept. 16, 1964            3 Sheets-Sheet 1

Inventor:
Harry C. Moon, Jr.
By
Hofgren, Wegner,
Allen, Stellman & McCord
Attys

United States Patent Office 3,187,509
Patented June 8, 1965

3,187,509
HYDROSTATIC TRANSMISSION
Harry C. Moon, Jr., Rockford, Ill., assignor to Sundstrand
Corporation, a corporation of Illinois
Filed Sept. 16, 1964, Ser. No. 396,939
14 Claims. (Cl. 60—53)

This invention relates to a hydrostatic transmission and more particularly to a new and improved control means therefor.

Hydrostatic transmissions are used extensively in vehicles in which it is desired to vary the ground speed while maintaining a constant prime mover speed for the purposes of maintaining maximum engine efficiency. In such applications it is desirable that the transmission be provided with a control means designed to permit the efficient transfer of power to the wheels of the vehicle and provide the normal control features associated with such a vehicle, such as directional control, speed control, torque control and braking action. It is further desirable that such transmissions be provided with means for positively retaining the control means at a given input signal and that this means be responsive to changes in load conditions imposed on the vehicle.

With the above in mind, it is a primary object of this invention to provide a new and improved hydrostatic transmission.

In one aspect, it is an important object to provide a new and useful transmission system in which fluid pressure forces at work in the transmission and acting to vary the displacement of the transmission may be used to effect a desired transmission control.

It is another object of this invention to provide a new and improved hydrostatic transmission which possesses the advantages mentioned above.

It is still another object of this invention to provide a new and improved hydrostatic transmission wherein the transmission supplies a feedback signal in response and opposition to the input signal imparted thereto.

It is a further object of this invention to provide a new and improved hydrostatic transmission having separate means for controlling the torque and speed thereof.

It is still a further object of this invention to provide a new and improved hydrostatic transmission having separate means for controlling forward and reverse torque output thereof.

It is yet a further object of this invention to provide a new and improved hydrostatic transmission provided with separate control means for varying the speed and torque thereof and having means for producing a signal in response to the hydraulic fluid pressure moment or transmission fluid system pressure conditions to adjust the effect of the control means.

It is yet a further object of this invention to provide a new and improved hydrostatic transmission having separate speed control means and separate torque control means and having means for selectively conditioning either said speed control means or torque control means to control.

Further objects and advantages will become apparent from the following detailed description taken in connection with the accompanying drawings, in which.

Figure 1:
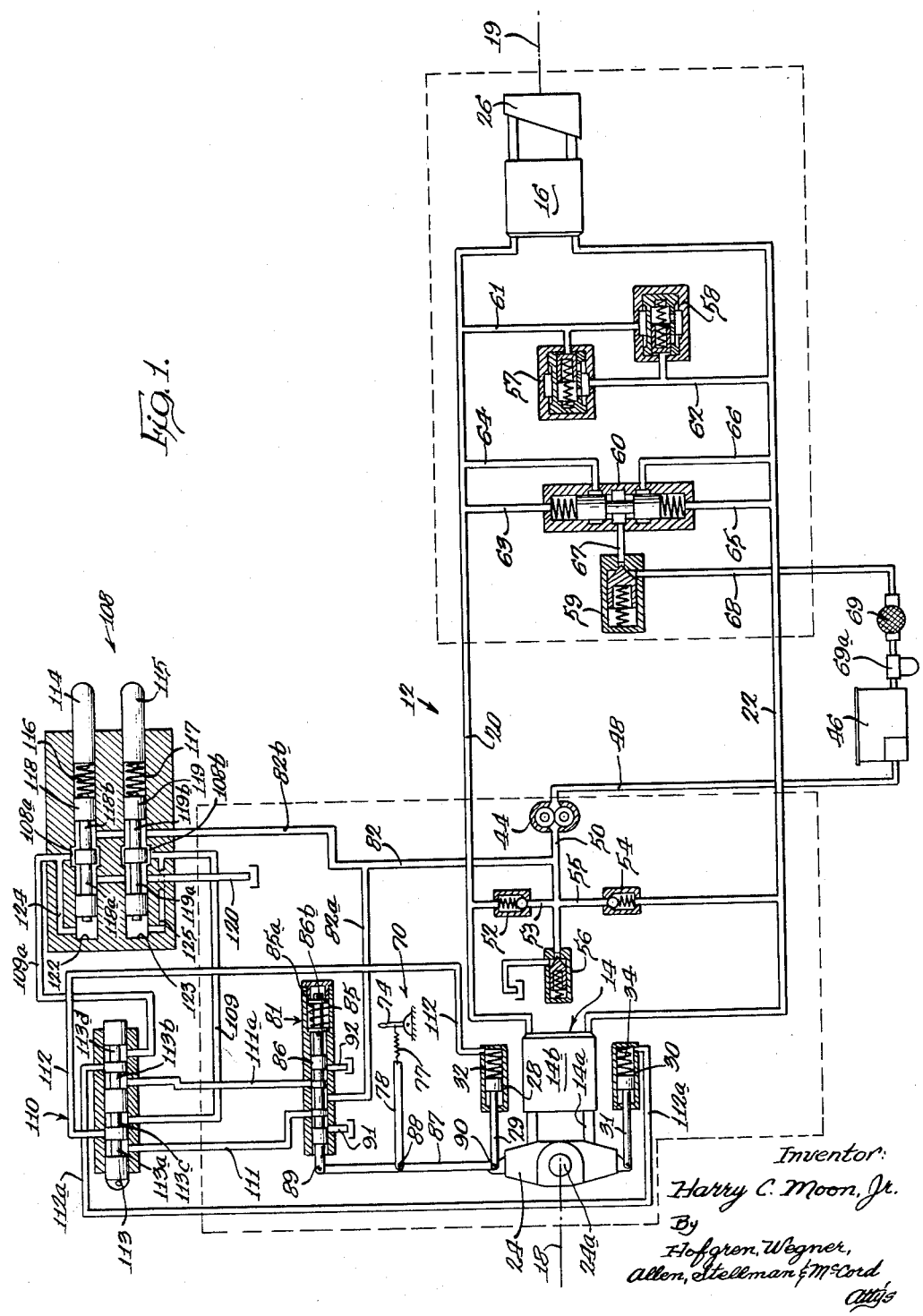
FIG. 1 is a diagrammatic illustration of one embodiment of this invention.

While this invention is susceptible of embodiment in many different forms, there is shown in the drawings and will herein be described in detail embodiments of the invention with the understanding that the present disclosure is to be considered as an exemplification of the principles of the invention and is not intended to limit the invention to the embodiments illustrated.

Figure 2:
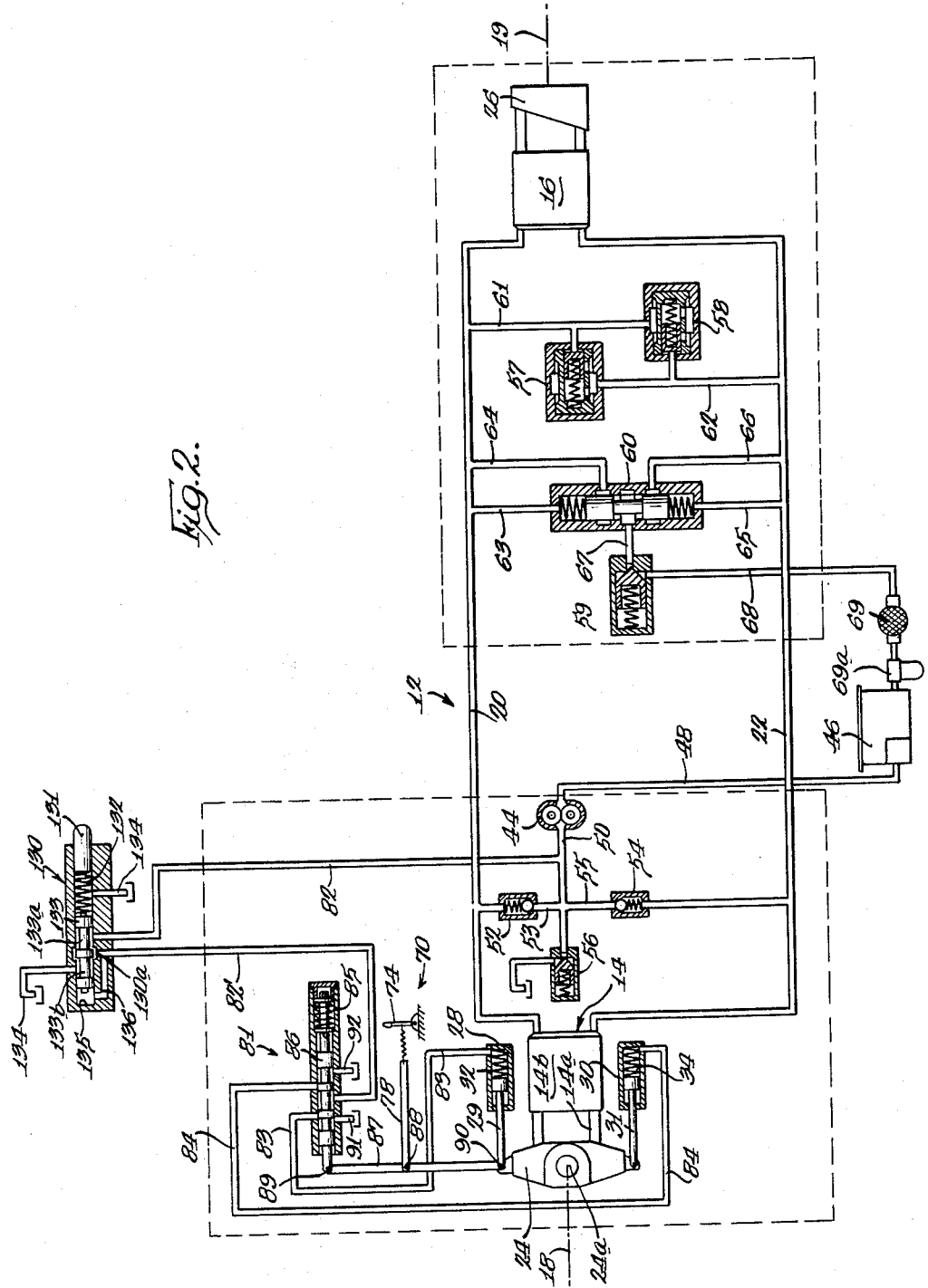
FIG. 2 is a diagrammatic illustration of another embodiment of this invention.

In FIGS. 1 and 2 there are shown forms of hydrostatic transmissions, each having a closed hydraulic circuit 12 with an engine driven pump 14 and a fluid driven motor 16. The pump is driven by a suitable engine or prime mover (not shown) through suitable means diagrammatically illustrated at 18. The output of the transmission is applied to an output shaft diagrammatically illustrated at 19 for propelling a vehicle, for example. Conduits 20 and 22, which carry the pumped fluid from the pump to the motor and return the same to the pump, are included in the closed circuit 12.

Preferably, both the pump and the motor are of an axial piston type. The pump is further provided with a pivotal variable displacement swashplate 24 so that the pump displacement may be varied. In such variable pumps, axial pistons 14a are reciprocable in a rotatable cylinder block 14b and are slidable at their outer ends against the swashplate and are pivotally associated with the swashplate. In addition, the pump swashplate 24 is reversible so that the directional output of the transmission may be changed from forward to reverse by appropriately positioning the swashplate. The swashplate pivot axis 24a, in the variable displacement pump used in the systems of FIGS. 1 and 2, is located in the plane of the centers of pivotal association of the piston outer ends with the swashplate and intersects the axis of the cylinder block.

In FIGS. 1 and 2, each system includes a fixed displacement motor having a fixed swashplate 26.

Two pump swashplate control cylinders 28 and 30 are provided and have slidable pistons linked with the pump swashplate by means of rods 29 and 31 for positioning the swashplate in response to actuation of the appropriate piston. Each of the cylinders is provided with a centering spring 32 or 34 to normally center the pump swashplate at a zero displacement position as shown in FIGS. 1 and 2. When fluid under pressure is admitted to one or the other of the two cylinders, one of the rods will move to tilt the swashplate in the desired direction, causing the other rod to push in opposition to centering spring 32 or 34.

A positive displacement gear-type replenishing and cooling pump 44, driven by the engine, e.g. from shaft 18, is provided in the transmission and is in communication with a reservoir 46 by means of a conduit 48 for supplying replenishing and cooling fluid to the system as well as control fluid through charge conduit 50. Spring-biased check valves 52 and 54 are provided, one in communication with each of the conduits 20 and 22, and both in communication with conduit 50 by means of the conduits 53 and 55, respectively. Check valves 52 and 54 facilitate supply of fluid to the low pressure side of the circuit 12 to replace leakage fluid and to displace heated fluid to cool the transmission. A make-up relief valve 56, which is also in communication with the charge conduit 50, is provided for removing the excess fluid pumped by the pump 44 as when the transmission is in neutral. The removed excess fluid is conducted from the make-up relief valve to drain in the reservoir 46.

The transmission is further provided with two high pressure relief valves 57, 58, a low pressure heated fluid relief valve 59, and a shuttle valve 60. The pressure relief valves 57 and 58 provide a means for preventing abnormally high pressure from existing in either of the two main hydraulic lines by relieving the high pressure line of surge pressures which may occur during acceleration or braking conditions. Conduits 61 and 62 communicate the fluid from either of the lines 20 or 22 to the valves 57 and 58, respectively, so that fluid from the higher pressure line will feed through conduit 61 or 62 to appropriately move the overpressure relief valve to permit the high pressure fluid to flow directly to the other line.

The low pressure relief valve 59 removes heated fluid from the circuit. For aiding the low pressure relief valve in performing its function, the shuttle valve 60 is in communication with the conduit 20 by means of conduits 63 and 64, and the conduit 22 by means of the conduits 65 and 66. The fluid in the high pressure conduit 63 or 65 will appropriately move the shuttle valve so that fluid from either the conduit 66 or 64, respectively, may pass through the valve and out a conduit 67 to the low pressure relief valve 59. From there the low pressure heated fluid is shunted to drain through a conduit 68, passing first through a heat exchanger 69 and filter 69a before arriving at the reservoir 46.

In FIG. 1, the motor 16 is a fixed displacement unit, and the transmission is controlled by varying the displacement of the pump 14 to obtain either forward or reverse operation and to attain the proper speed and/or torque output. Displacement of the pump is manually controlled alternatively through either a speed control 81 or a torque control 108, either of which may be selectively conditioned for control by means of a selector control 110. The latter is adapted to place either the speed control 81 or the torque control 108 in the circuit for controlling displacement of the pump 14 while placing the other out of the circuit.

Displacement control valve 81 for controlling the displacement varying means 28 and 30 receives control fluid from the control pump 44 by means of a conduit 82, 82a. Pump control cylinder supply conduits 111, 112 and 111a, 112a provide means for supplying control fluid from the valve 81 to either of the pump control cylinders 28 or 30, respectively. The valve 81 is provided with a centering spring 85 which serves to normally center the valve stem 86 in a neutral position so that no fluid may be supplied through either conduit 111 or 111a. With valve stem 86 in centered position, conduits 111 and 111a are in bleeding communication with drain conduits 91 and 92, the lands of valve stem 86 permitting such bleeding. As the valve stem is moved either to the left or to the right from center position, control fluid is supplied through either conduit 111 or 111a to the control cylinders 28 or 30, respectively. The extent to which the control handle 74 is moved in either direction will determine the amount of fluid supplied through the conduit 111 or 111a to the pump control cylinder and therefore determines the extent to which the pump swashplate is tilted in the respective direction.

A manually operable control system is provided for varying pump displacement. Accordingly, for moving the valve stem 86, a pump control rod 78 is mounted at one end to or through a resilient link in the form of a compression and tension spring 77 to a pivotally mounted and manually operable control handle 74 suitably retarded for retention where positioned. The other end of rod 78 is pivotally mounted to the central portion of a translating link 87, as at 88. The link 87 is also pivotally secured at one end at 89 to one end of the valve stem 86, and at its other end at 90 to the pump swashplate 24.

Handle 74 is movable between a central neutral position shown in the drawings and forward and reverse positions on either side of the central position for increasing pump displacement in either direction from minimum displacement. Movement of the handle 74 away from neutral in one direction moves rod 78 in the corresponding direction to pivot link 87 about point 90 in the corresponding direction. The valve stem 86 requires a very little force for sliding movement compared with the force required to pivot the pump swashplate 24. Thus, movement of the rod 78, resulting from pivoting handle 74, first displaces the valve stem 86, and the control link 87 pivots about its point 90 of attachment to the swashplate 24. This permits fluid from the control pump 44 and conduit 82 to flow through the pump control valve 81 and the proper conduit 111 or 111a to the proper pump control cylinder 28 or 30 to establish the desired swashplate angle in the desired direction. Resilient link 77 prevents valve damage on overtravel of the handle 74.

The transmission includes a feedback system responsive to swashplate movement for controlling the varying of displacement to a value corresponding to the amount of movement of the control handle 74. Accordingly, as the swashplate 24 moves to increase displacement to the desired swashplate angle, the control link 87 pivots about its mounting 88 on control rod 78 to return the valve stem 86 back toward its centered position. Effectively, the valve stem is returned to a metering position blocking the pressurized cylinder from drain conduit 91 or 92 and metering control fluid from passage 82a to the pressurized cylinder, or there may be some slight unobjectionable hunting of the valve member to opposite sides of such metering position.

Valve stem 86 is normally urged toward its centered position by compression spring 85 seated against collars 85a, which are slidable on stem 86 between pins 86b and which also abut the valve casing. Valve 81 causes positive centering of swashplate 24 to its zero displacement position upon movement of handle 74 to neutral since centering spring 85 moves the stem 86 to neutral position to exhaust both the pump control cylinders 28 and 30, whereupon the springs 32 and 34 within the pump control cylinders 28 and 30 position the pump swashplate in neutral.

The displacement control and positive neutral features are described in more detail and claimed in Hann application Serial No. 362,257, filed April 24, 1964, and assigned to the assignee of this invention.

The pump supply conduit 82 has two branches 82a and 82b which supply control fluid to the displacement control valve 81 and the torque control valve 108, respectively. The torque control valve 108 is in communication with a selector valve 110 by means of conduits 109 and 109a, and the selector valve 110 is in communication with the displacement control valve 81 by means of conduits 111 and 111a. Additionally, the selector valve is in communication with the pump control cylinders 28 and 30 by means of the conduits 112 and 112a, respectively.

The selector valve 110 is manually operable and, as indicated, permits the vehicle operator to choose the means controlling the transmission output, that is, either the torque control valve 108 or the displacement control valve 81. To this end the selector valve 110 is provided with a manually or pedally operated valve stem 113 having reduced diameter portions 113a, 113b, 113c and 113d which are located opposite the displacement control valve outlet conduits 111 and 111a and the torque control valve outlet conduits 109 and 109a, respectively. Movement of the valve stem to the right will place conduits 111 and 111a in communication with conduits 112 and 112a which lead to pump control cylinders 28 and 30, respectively, so that the displacement control valve 81 controls the fluid being supplied to the pump control cylinders. Movement of the valve stem 113 to the left places the conduits 109 and 109a in communication with conduits 112 and 112a, respectively, so that the torque control valve 108 may be used to control the fluid being supplied to the pump control cylinders. When the selector valve 110 is positioned so that the displacement control valve 81 governs the pump control cylinders 28 and 30, the transmission operates in the manner described above so that movement of the control handle 74 controls the displacement control valve 81 and pump swashplate 24.

Figure 3:
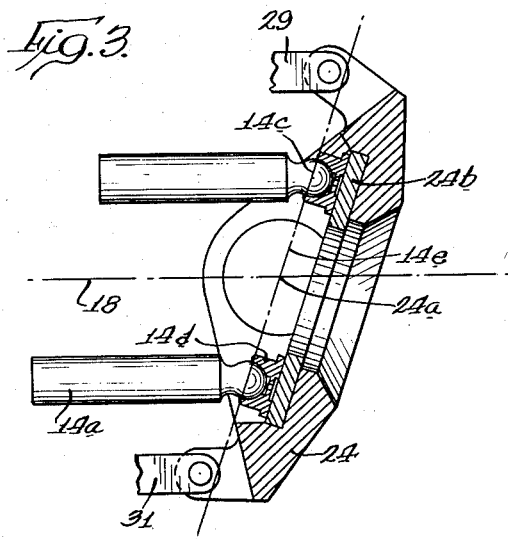
FIG. 3 is a longitudinal sectional view illustrating a fragmentary portion of the pump utilized in the transmission of FIGS. 1 and 2.
Figure 4:
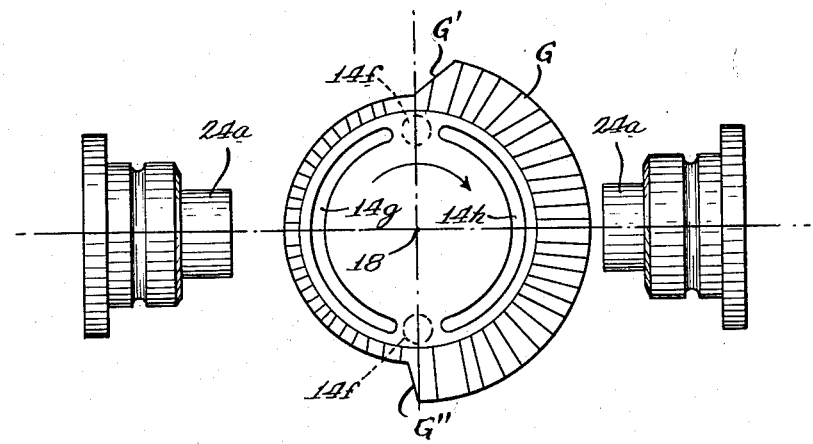
FIG. 4 is a diagrammatic transverse cross section of the pump.

In order to fully appreciate the operation of a torque control valve 108, reference should be made more specifically to the construction of a pump such as that illustrated at 14 in FIG. 1. Accordingly, additional features are shown in FIGS. 3 and 4 where it will be seen that swashplate 24, pivotally mounted as at 24a and controlled for adjustment by links 29 and 31, is provided with an annular face plate 24b. Pistons 14a have spherical ends 14c with universally mounted bearing slippers 14d thereon engaging the face plate 24b. The pivot axis 24a for the swashplate is transverse to and intersecting the axis of the shaft 18 and cylinder block 14b at the point where such axis intersects a plane 14e containing the centers of the spherical piston ends 14c.

As is well understood in connection with axial piston pumps of the type described herein, the pistons 14a reciprocate respectively in cylinders (not shown) in the cylinder block 14b arranged in an annular array around the axis of the cylinder block. The ends of such cylinders remote from the swashplate are provided with cylinder ports as at 14f leading to the end face of the cylinder block so that as the cylinder block rotates, the cylinder ports successively communicate with arcuate inlet and outlet ports 14g and 14h provided in a port plate (not shown) and communicating respectively with circuit conduits 20 and 22. The arrangement is such that on rotation of the cylinder block, the pistons are reciprocated by the swashplate and during intake strokes communicate with the inlet port of 14g and 14h and during discharge strokes communicate with the outlet port of 14g and 14h.

Hydraulic fluid forces acting through the pistons 14a on the swashplate 24 extend in the direction of the longitudinal axes of the pistons and act through the pivot centers at 14c. These forces are theoretically equal above and below the swashplate 24a. That is, theoretically the forces above the axis tending to pivot the swashplate in one direction about pivot axis 24a are equal to the forces below the axis 24a tending to pivot the swashplate in the opposite direction about the axis 24a. Specifically, in theory, such forces (above and below the axis 24a) acting on the pistons 14a in communication with valve plate port 14g balance each other, and similarly such forces acting on the pistons in communication with valve plate port 14h also balance each other.

However, in actual use of swashplate pumps, particularly at high pressure, other forces have been found to vary the theoretically balanced forces acting through the pistons 14a on the swashplate 24. These include two major forces, namely a piston inertia moment and a hydraulic fluid pressure moment. Such forces are explained in detail in the copending application of Hann et al., Serial No. 113,697, filed May 31, 1961.

Briefly, the piston inertia moment arises due to reciprocation of the pistons during rotation of the cylinder block. The piston inertia moment tends to increase the swashplate angle and is proportional to the piston stroke. More particularly, during intake, each piston reaches maximum deceleration at the end of its stroke and is restrained by the swashplate and during discharge reaches maximum acceleration at the start of the discharge stroke, the force to accelerate the piston being imparted by reaction against the swashplate. It will be understood that such deceleration of the pistons at the end of the intake strokes and acceleration of the pistons at the beginning of the pump strokes, both by the swashplate, tend to pivot the swashplate in a stroke-increasing direction. Thus, the swashplate is subject to a stroke-increasing inertia moment that is zero in the neutral position of the swashplate assembly and at a given input speed of drive shaft 18 the moment increases in direct proportion to pivotal movement of the swashplate in either direction from its neutral position. At any fixed pump speed, the moment can be canceled by the servo piston centering spring 32 or 34 biasing the swashplate toward a central position.

The fluid pressure moment is due to the compressibility of the fluid and the delay in pressure change after a piston passes the porting crossover between ports 14g and 14h. Such fluid pressure moment tends to reduce the swashplate angle during pumping and to increase the swashplate angle during motoring. More specifically, the hydraulic fluid is compressible to some extent at high pressure and there is some delay in pressure change on crossover between the ports 14g and 14h, due to the compressibility and small valve openings requiring momentary delays for transfer of fluid to effect pressure changes. The net effect is illustrated by the graph G in FIG. 4 which includes an illustration at G' that the pressure rises to maximum in each cylinder only gradually as the pistons start the compression strokes rather than rising instaneously to maximum pressure. As seen at G'', the pressure drops much more quickly on the crossover to the low pressure side. As a result the average forces above the swashplate axis 24a on the high pressure side of the pump are less than the similar forces below this axis, resulting in a stroke-reducing net pressure moment acting on the swashplate below the swashplate axis 24a. During motoring the fluid pressure moment is stroke-increasing.

The fluid pressure moment is a function of system pressure. Thus, during pumping, the higher the system pressure the greater the force biasing the swashplate toward neutral position. Torque control valve 108 is responsive to the fluid pressure moment.

The valve 108 is provided with two manually or pedally actuated plungers 114 and 115. Each plunger is intended to control the torque output of the transmission in one direction. For example, plunger 114 may serve to operate the vehicle in a forward direction, and plunger 115 may serve to operate the vehicle in a reverse direction. Each plunger abuts a valve spring 116 or 117, which in turn is mounted at the end of valve stem or spool 118 or 119, respectively.

Each valve spool 118 or 119 is provided with portions of reduced diameter such as 118a, 118b and 119a, 119b. Enlarged grooves 108a and 108b are provided in the valve housing. The reduced diameter portions 118b and 119b are in communication with the control fluid conduit 82b, and the reduced diameter portions 118a and 119a are in communication with a drain conduit 120. When the valve is in neutral as shown in FIG. 1, grooves 108a and 108b are blocked by the valve stems so that fluid may not pass through or return from conduits 109a or 109, respectively.

Each valve stem receiver in valve 108 is provided with a chamber 122 or 123 at the end of the valve spool 118 or 119, respectively. Chambers 122 and 123 are respectively in comunication with conduits 109a and 109 by means of conduits 124 and 125.

To control the output torque of the vehicle, the operator is provided with two foot pedals, one of which operates plunger 114 to control the forward torque of the vehicle, and the other of which operates plunger 115 to control the reverse torque. Depressing the forward control plunger 114 or reverse control plunger 115 biases the valve spring 116 or 117 against the valve spool 118 or 119, moving the valve spool to a position which will permit control fluid from the conduit 82b to pass around the reduced diameter section 118b or 119b, out the groove 108a or 108b and through the conduit 109a or 109 to the selector valve 110. Assuming that the valve stem 113 has been appropriately positioned so that the reduced diameter portions 113c and 113d establish communcation between conduits 109a and 112a and between 109 and 112, the control fluid will be supplied to the pump control cylinder 30 or 28. At the same time, conduit 124 or 125 connects conduit 109a or 109, in communication with the pump control cylinder 30 or 28, to chamber 122 or 123. As pressure builds up in the pump control cylinder, the valve spool 118 or 119 is biased to the right in FIG. 1 to a position closing control conduit 109 or 109a, stopping the flow of oil from the control pump 44 to the pump control cylinder. The amount of depression of plunger 114 or 115 regulates the compression force of spring 116 or 117 which must be overcome by pressure in chamber 122 or 123 before the control conduit 109a or 109 to the control cylinder 30 or 28 is closed. Thus, the valve 108 will maintain a pressure in the pump control cylinder 30 or 28 in proportion to the position of the manually or pedally operated plunger 114, and therefore maintain a system pressure proportional to plunger depression and spring compression.

It will be understood that the pressure in pump control cylinder 30 or 28 will be opposed by the fluid pressure moment. The fluid pressure moment thus provides a system pressure limit for any particular setting of operator plungers 114 or 115. More specifically, where the load on the output shaft 19 increases above the output torque setting of plungers 114 or 115, the fluid pressure moment within pump 14 tends to pivot the swashplate 24 in a stroke-reducing direction, thereby compressing fluid in the pressurized cylinder 28 or 30 tending to move valve stem 118 or 119 to permit return of the swashplate toward neutral. However, on occurrence of such increased load, the plungers 114 or 115 may be depressed further to increase the setting thereby to increase system pressure and overcome the load. Thus, it will be understood that the plungers 114 and 115 may be utilized to control the transmission output in a manner similar to that by which an accelerator is utilized to control an automotive engine and transmission.

To accelerate the vehicle in a forward or reverse direction, the operator depresses plunger 114 or plunger 115, respectively, to increase the control pressure being supplied to the proper control cylinder 28 or 30. This will bias the swashplate toward a full stroke position producing output torque proportional to plunger position and spring compression.

To decelerate the vehicle, the operator may release the force on the plunger 114 or 115 which reduces the fluid pressure supplied to the control cylinder 28 or 30. This reduction in pressure permits the centering spring 32 or 34 to move the swashplate 24 toward a neutral position. When a faster braking action is desired, the operator may depress the opposite control plunger 115 or 114 which will bias the swashplate toward a neutral position. The farther such opposite plunger is depressed, the greater will be the braking effect on the transmission. When neither plunger 114 nor plunger 115 is depressed, the control cylinder centering spring will hold the pump swashplate in a neutral position.

In operation, it is contemplated that the torque control might be utilized in an agricultural combine, for example, to control vehicle propulsion along a highway or the like in much the same manner that an automobile negotiates such highway. On the other hand, the displacement control 81 may be utilized to set a predetermined combine speed in a harvesting operation where a relatively constant ground speed is desired regardless of load.

In the transmission of FIG. 2 a displacement or speed control valve 81 is used in series with a single torque control valve 130 and the displacement control valve 81 is used to select direction and speed while the torque control valve 130 controls the maximum torque output of the vehicle.

The torque control valve 130 is similar to the torque control valves in FIG. 1. Briefly, it regulates the pressure in the conduit 82' which leads from the torque control valve 130 to the displacement control valve 81. Valve 130 is provided with a compresion spring 132 bearing between valve plunger 131 and one end of the valve stem or spool 133. The valve spool 133 is provided with reduced diameter portions 133a and 133b, and a groove 130a in the inner wall of the valve casing surrounds a portion of the valve spool 133 when the valve spool 133 is in its neutral position, as shown in FIG. 2. Control fluid is normally supplied by way of conduit 82, reduced diameter portion 133a, and groove 130a, to the displacement control valve 81. With valve spool 133 in its neutral position, a drain conduit 134 communicates with reduced diameter portion 133b. A second drain 134a is provided in the chamber housing spring 132. Also, a chamber 135 is located at the opposite end of the valve spool 133 and is in communication with the conduit 82' by means of a conduit 136.

As in the embodiment of FIG. 1, it is contemplated that the transmission of FIG. 2 may be controlled by either the speed control valve 81 or the torque control valve 130, as by setting either of the valves in one operated position and utilizing the other for control in varying the transmission. For example, the torque control valve 130 may be set at a fully operated position and the speed control valve 81 utilized to control the transmission. Under such conditions, the valve 81 will normally provide a response similar to that provided in the absence of the torque valve 130 since the latter is set to allow full pressure at the valve 81. However, the torque and valve will under such circumstances constitute a means limiting the maximum system pressure because if the load on the transmission output shaft 19 exceeds the maximum torque setting of the valve 130, the rise in system pressure will allow the torque valve to relieve control pressure to the pressurized cylinder 28 or 30, thereby allowing return of the swashplate toward neutral until such time as the load is reduced. The transmission would become stalled without stalling the engine or other prime mover driving the pump 14.

According to such mode of operation, when the handle 74 is moved, for example, to the right in FIG. 2 for reverse operation of the vehicle, the control link 78, pivotally connected at 88 to the link 87, pulls link 87 about its pivotal mounting 90, moving the valve stem 86 to the right of center and permitting control fluid under pressure in the condit 82 and 82' to be directed to the control cylinder 30 by means of conduit 84. As the swashplate is positioned in response to the movement of the rod 31 under the influence of fluid supplied to the cylinder 30, the link 87 pivots about its mounting 88 with the link 78, causing the valve stem 86 to move to the left, closing the valve to a metering position as described in connection with FIG. 1 and holding the swashplate in a position corresponding to the position of the handle 74, and subjected to the torque setting of valve 130.

On the other hand, the control valve 81 may be set to select the maximum transmission speed and the direction of transmission operation, either forwardly or reversely, and to normally allow a full swashplate inclination, but subject to control of the transmission by varying the setting on the torque valve 130. Under these conditions, though the valve 81 may be set to provide full displacement, the metering communication through valve 81 between the pressurized control cylinder and the torque valve, allows the torque valve to impose a pressure setting on the system proportional to the compression of the torque valve spring 132.

As in the system of FIG. 1, the first described mode of operation, with valve 81 controlling, might be employed to select a predetermined speed for a combine or the like during a harvesting operation while the second mode of operation, with the transmission controlled by torque valve 130, might be employed to propel the combine or the like along a highway, attaining a torque output responsive to movement of plunger 131 in a manner similar to that in which an engine accelerator controls an automobile with a conventional transmission such as a torque converter. So long as the load in the vehicle remains approximately constant, speed output is varied in accordance with depression of plunger 131. If increased loads are encountered, the plunger 131 must be depressed further in order to maintain the desired speed. On the other hand, if the loads decrease, the plunger must be released to hold the vehicle speed down to the desired value.

I claim:
1. A hydrostatic transmission system, comprising,
   (a) a hydraulic motor,
   (b) a rotatable cylinder block axial piston variable angle swashplate pump constructed such that a fluid pressure moment acting through the pistons on the swashplate when inclined from neutral exerts forces tending to return the swashplate to neutral and proportional to the pressure on the high pressure side of the pump,
   (c) conduit means connecting the pump outlet to the motor inlet,
   (d) fluid operable means for varying the swashplate angle to vary pump displacement in opposition to the fluid pressure moment, and
   (e) torque valve means including
      (e-1) a movable valve member,
      (e-2) manually controllable means for urging the valve member in a direction to supply fluid to the displacement varying means to establish a predetermined system pressure proportional to manual pressure thus applied to the valve member, and
      (e-3) means responsive to pressure in the displacement varying means for urging the valve member in the opposite direction to block the supply of control fluid to the displacement varying means when the predetermined system pressure exists.

2. A hydrostatic transmission system, comprising,
   (a) a hydraulic motor,
   (b) a rotatable cylinder block axial piston pump, including
      (b-1) a variable angle swashplate urged in a stroke-reducing direction by a fluid pressure moment proportional to system pressure,
   (c) conduit means connecting the pump outlet to the motor inlet so that the pump delivers fluid to drive the motor,
   (d) fluid operable means for moving the swashplate from neutral to vary pump displacement in opposition to the fluid pressure moment to vary the pressure of fluid delivered by the pump,
   (e) means providing a source of control fluid under pressure, and
   (f) valve means controlling the supply of control fluid to the displacement varying means, including
      (f-1) a movable valve member controlling the flow of fluid relative to the displacement varying means,
      (f-2) selectively controllable resiliently yieldable means for urging the valve member in a direction to supply fluid to the displacement varying means to establish a predetermined system pressure and torque output proportional to the pressure thus applied to the valve member, and
      (f-3) means responsive to pressure in the displacement varying means for urging the valve member in the opposite direction to block the supply of control fluid to the displacement varying means when the predetermined system pressure exists.

3. A hydrostatic transmission system, comprising,
   (a) a hydraulic motor,
   (b) a rotatable cylinder block axial piston variable displacement pump including
      (b-1) a variable angle swashplate urged in a stroke-reducing direction by a fluid pressure moment proportional to system pressure,
   (c) conduit means connecting the pump outlet to the motor inlet and the motor outlet to the pump inlet,
   (d) means normally resiliently biasing the pump washplate to neutral,
   (e) fluid operable means for varying the swashplate angle from neutral to vary pump displacement in opposition to the fluid pressure moment and the biasing means to vary the pressure of fluid delivered by the pump, and
   (f) torque valve means controlling the supply of control fluid to the displacement varying means to vary the pressure therein and vary system pressure and torque output proportionately including
      (f-1) a movable valve member controlling the flow of fluid relative to the displacement varying means,
      (f-2) manually controllable resiliently yieldable means for urging the valve member in a direction to supply fluid to the displacement varying means to establish a predetermined system pressure proportional to the manual pressure thus applied to the valve member, and
      (f-3) means responsive to pressure in the displacement varying means for urging the valve member in the opposite direction to block the supply of control fluid to the displacement varying means when the predetermined system pressure exists and connect the displacement varying means to drain if the predetermined pressure is exceeded.

4. A system as defined in claim 3 where the yieldable means of (f-2) includes
   (f-2a) a manually controllable plunger reciprocably mounted, and
   (f-2) a resiliently yieldable compression spring acting between the plunger and one end of the valve member,
and the responsive means of (f-3) includes
   (f-3a) means communicating the opposite end of the valve member with the fluid operable displacement varying means.

5. A hydrostatic transmission system, comprising,
   (a) a hydraulic motor having an output shaft adapted to be connected to a vehicle propulsion means,
   (b) a rotatable cylinder block axial piston variable angle swashplate pump
      (b-1) including an input shaft adapted to be connected to a prime mover and
      (b-2) constructed such that a fluid pressure moment acting through the pistons against the swashplate when inclined from neutral exerts a force tending to return the swashplate to neutral proportional to the presure on the high pressure side of the pump and system,
   (c) conduit means connecting the pump outlet to the motor inlet and the motor outlet to the pump inlet so that the pump delivers fluid to drive the motor and the motor returns fluid to the pump,
   (d) means normally resiliently biasing the pump swashplate to neutral,
   (e) fluid operable means for moving the swashplate in opposite directions from neutral to vary pump displacement in opposition to the fluid pressure moment and the biasing means to vary the pressure of fluid delivered by the pump,
   (f) means providing a source of control fluid under pressure, and
   (g) torque valve means controlling the supply of control fluid to the fluid operable displacement varying means to vary the pressure therein and vary system pressure and torque output proportionately, including
      (g-1) a movable valve member controlling the flow of fluid relative to the displacement varying means,
      (g-2) manually controllable resiliently yieldable means for urging the valve member in a direction to supply fluid to the displacement varying means to establish a predetermined system pressure proportional to the pressure thus applied to the valve member, and (g-3) means responsive to pressure in the displacement varying means for urging the valve member in the opposite direction to block the supply of control fluid to the displacement varying means when the predetermined system pressure exists and connect the displacement varying means to drain if the predetermined pressure is exceeded.

6. A hydrostatic transmission system, comprising,
(a) a hydraulic motor,
(b) a pump including
  (b-1) a rotatable cylinder block,
  (b-2) a plurality of axially disposed pistons arranged in annular array about the axis of the cylinder block and reciprocable therein, each having a spherically shaped end for transmitting piston reciprocating forces,
  (b-3) a swashplate for reciprocating the pistons pivotally mounted for movement about an axis intersecting the cylinder block axis where the latter pierces the plane containing the centers of said spherically shaped piston ends, so that the swashplate is urged in a stroke-reducing direction by a fluid pressure moment proportional to system pressure,
(c) conduit means connecting the pump outlet to the motor inlet so that the pump delivers fluid to drive the motor,
(d) means normally resiliently biasing the pump swashplate to neutral,
(e) fluid operable means for moving the swashplate from neutral in opposition to the fluid pressure moment and the biasing means to vary pump displacement and the pressure of fluid delivered by the pump,
(f) means providing a source of control fluid under pressure, and
(g) torque valve means including
  (g-1) a movable valve member,
  (g-2) manually controllable resiliently yieldable means for urging the valve member in a direction to supply fluid to the displacement varying means to establish a predetermined system pressure and torque output proportional to the manual pressure thus applied to the valve member, and
  (g-3) means responsive to pressure in the displacement varying means for urging the valve member in the opposite direction to block the supply of control fluid to the displacement varying means when the predetermined system pressure exists and connect the displacement varying means to drain if the predetermined pressure is exceeded.

7. A hydrostatic transmission system, comprising,
(a) a hydraulic motor,
(b) a rotatable cylinder block axial piston reversible variable angle swashplate pump including
  (b-1) an input shaft adapted to be connected to a prime mover and
  (b-2) constructed such that a fluid pressure moment acting through the pistons against the swashplate when inclined from neutral exerts a force tending to return the swashplate to neutral proportional to the pressure on the high pressure side of the pump and system,
(c) conduit means connecting the pump outlet to the motor inlet and the motor outlet to the pump inlet,
(d) reversible fluid operable means for moving the swashplate in opposite directions from neutral to vary pump displacement in opposition to the fluid pressure moment to vary the pressure of fluid delivered by the pump,
(e) means providing a source of control fluid under pressure, and
(f) separate torque valves respectively controlling the supply of control fluid to opposite sides of the fluid operable displacement varying means each including
  (f-1) a movable valve member,
  (f-2) manually controllable resiliently yieldable means for urging the valve member in a direction to supply fluid to the displacement varying means to establish a predetermined system pressure and torque output proportional to the pressure thus applied to the valve member, and
  (f-3) means responsive to pressure in the displacement varying means for urging the valve member in the opposite direction to block the supply of control fluid to the displacement varying means when the predetermined system pressure exists and connect the displacement varying means to drain if the predetermined pressure is exceeded.

8. A combination as defined in claim 7, including
(g) a displacement control valve intermediate the source of control fluid and the displacement varying means in parallel with the torque valves comprising
  (g-1) a valve member movable in either of opposite directions a predetermined distance from a neutral position for supply control fluid to the displacement varying means to obtain a corresponding predetermined swashplate angle,
  (g-2) manually operable means for effecting such valve member movement, and
  (g-3) a mechanical feedback linkage associated with the swashplate, the valve member and the manual control therefor to return the valve member toward neutral when the predetermined swashplate angle is attained, and
(h) a manually selectively operable selector valve in series with the torque valves and the displacement valve for alternately placing one or the other in condition to control the displacement varying means.

9. A system as defined in claim 8 wherein
(i) the torque valves and the displacement valve are constantly in communication with the source of control fluid and in communication with the selector valve, and the latter is constantly in communication with the displacement varying means for communicating the latter with either the torque valve or the displacement valve.

10. A hydrostatic transmission system, comprising,
(a) a hydraulic motor having an output shaft adapted to be connected to a vehicle propulsion means,
(b) a rotatable cylinder block axial piston pump including
  (b-1) an input shaft adapted to be connected to a prime mover, and
  (b-2) a variable angle swashplate urged in a stroke-reducing direction by a fluid pressure moment proportional to system pressure,
(c) conduit means connecting the pump outlet to the motor inlet so that the pump delivers fluid to drive the motor,
(d) fluid operable means for moving the swashplate from neutral to vary pump displacement in opposition to the fluid pressure moment to vary the pressure of fluid delivered by the pump,
(e) means providing a source of control fluid under pressure, and
(f) a torque valve including
  (f-1) a movable valve member,
  (f-2) manually controllable resiliently yieldable means for urging the valve member in a direction to supply fluid to the displacement varying means to establish a predetermined system pressure and torque output proportional to the manual pressure thus applied to the valve member, and (f-3) means responsive to pressure in the displacement varying means for urging the valve member in the opposite direction to block the supply of control fluid to the displacement varying means when the predetermined system pressure exists and connect the displacement varying means to drain if the predetermined pressure is exceeded.

11. A combination as defined in claim 10, including (g) a displacement control valve intermediate the source of control fluid and the displacement varying means in parallel with the torque valve comprising
- (g-1) a valve member movable a predetermined distance from a neutral position for supplying control fluid to the displacement varying means to obtain a corresponding predetermined swashplate angle,
- (g-2) manually operable means for effecting such valve member movement, and
- (g-3) a mechanical feedback linkage associated with the swashplate and the valve member to return the valve member toward neutral when the predetermined swashplate angle is attained, and (h) a manually selectively operable selector valve in series with the torque valve means and the displacement valve means for alternately placing one or the other in control of the displacement varying means.

12. A system as defined in claim 11 wherein (i) the torque valve and the displacement valve are both constantly in communication with the source of control fluid and in communication with the selector valve, and the latter is constantly in communication with the displacement varying means for communicating the latter with either the torque valve or the displacement valve.

13. A combination as defined in claim 10, including (g) a displacement control valve intermediate the source of control fluid and the displacement varying means in series with the torque valve comprising
- (g-1) a valve member movable a predetermined distance from a neutral position for supplying control fluid to the displacement varying means to obtain a corresponding predetermined swashplate angle,
- (g-2) manually operable means for effecting such valve member movement, and
- (g-3) a mechanical feedback linkage associated with the swashplate and the valve member to return the valve member toward neutral when the predetermined pump displacement is attained, whereby either the torque valve or the displacement valve may be preset and the other utilized to control the transmission.

14. A combination as defined in claim 10 including (g) a direction and displacement control valve intermediate the source of control fluid and the displacement varying means in series with the torque valve comprising
- (g-1) a valve member movable in either of opposite directions a predetermined distance from a neutral position for supplying control fluid to the displacement varying means to obtain a corresponding predetermined swashplate angle,
- (g-2) manually operable means for effecting such valve member movement, and
- (g-3) a mechanical feedback linkage associated with the swashplate, the valve member and the manual control therefor to return the valve member toward neutral when the predetermined swashplate angle is attained, whereby either the torque valve or the displacement valve may be preset and the other utilized to control the transmission.

No references cited.

JULIUS E. WEST, *Primary Examiner.*